United States Patent [19]

Broman et al.

[11] Patent Number: 4,709,541
[45] Date of Patent: Dec. 1, 1987

[54] GRASS/LAWN DEBRIS HANDLING SYSTEM

[75] Inventors: Donald E. Broman; Loren F. Hansen; Donald J. Huber, all of Lincoln, Nebr.

[73] Assignee: Outboard Marine Corporation, Waukegan, Ill.

[21] Appl. No.: 802,075

[22] Filed: Nov. 26, 1985

Related U.S. Application Data

[63] Continuation of Ser. No. 581,654, Feb. 21, 1984, abandoned.

[51] Int. Cl.$^4$ ............................................. A01D 34/12
[52] U.S. Cl. .......................................... 56/202; 56/16.6
[58] Field of Search ................................. 56/202, 16.6

[56] References Cited

U.S. PATENT DOCUMENTS

| | | |
|---|---|---|
| 3,802,173 | 4/1974 | Opitz . |
| 3,844,615 | 10/1974 | Anderson ............................. 298/10 |
| 3,880,468 | 4/1975 | Steingas et al. ....................... 298/11 |
| 3,881,304 | 5/1975 | Lempke . |
| 3,958,401 | 5/1976 | Carpenter . |
| 3,974,631 | 8/1976 | Rhodes ................................... 56/202 |
| 4,069,649 | 1/1978 | Mullet et al. .......................... 56/202 |
| 4,104,852 | 8/1978 | Tackett ................................... 56/202 |
| 4,168,600 | 9/1979 | Klug . |
| 4,173,111 | 11/1979 | Peterson ............................ 56/320.2 |
| 4,199,923 | 4/1980 | Blake .................................... 56/16.6 |
| 4,430,038 | 2/1984 | Rempel et al. ....................... 298/11 |
| 4,476,668 | 10/1984 | Reilly ................................... 56/202 |
| 4,487,007 | 12/1984 | Mullet et al. .......................... 56/202 |
| 4,569,187 | 2/1986 | Spiker et al. .......................... 56/202 |

FOREIGN PATENT DOCUMENTS 986339 1/1983 U.S.S.R. ................................. 56/28

Primary Examiner—Robert Peshock
Assistant Examiner—John Weiss
Attorney, Agent, or Firm—John T. Synnestvedt; Richard D. Weber

[57] ABSTRACT

A grass/lawn debris handling system for a lawn mower having a side grass discharge duct includes a rigid hopper mounted on the side of the mower proximate tha grass discharge duct. A substantially vertical chute mounted on the discharge duct communicates at its lower end with the duct and at its upper end with the front end of the hopper. Relative movement of the chute and the hopper as well as the selective disconnection and reconnection thereof is made possible by an oversized opening in the hopper for receiving the chute upper end and flexible seal means in the opening for sealing the space between the hopper and chute end. The hopper is supported on a lift arm pivoted at the rear of the mower. A cylinder provides selective pivotal movement of the lift arm to rotate the hopper into an elevated dumping position. A hinged hopper door of air-permeable material opens automatically when the hopper is elevated to its dumping position to permit discharge of the hopper contents.

22 Claims, 10 Drawing Figures

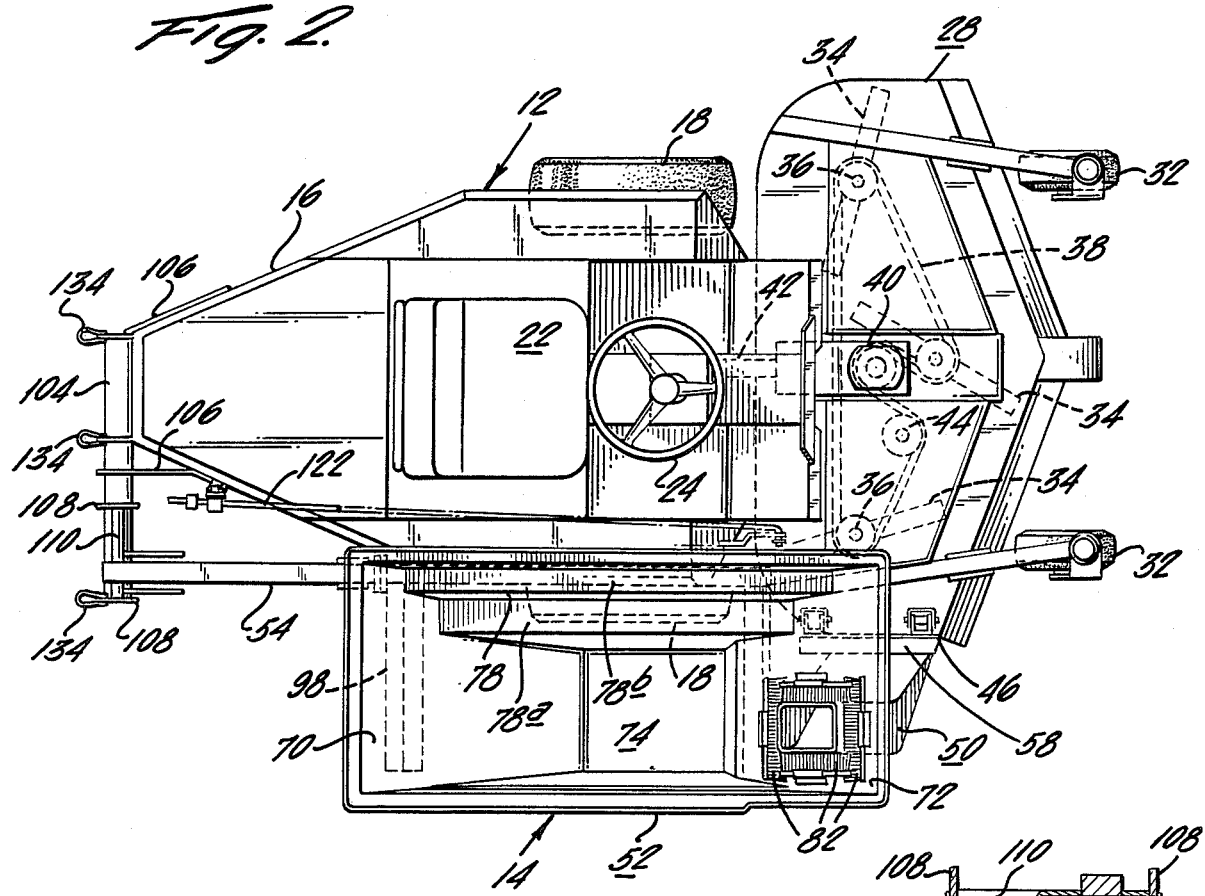
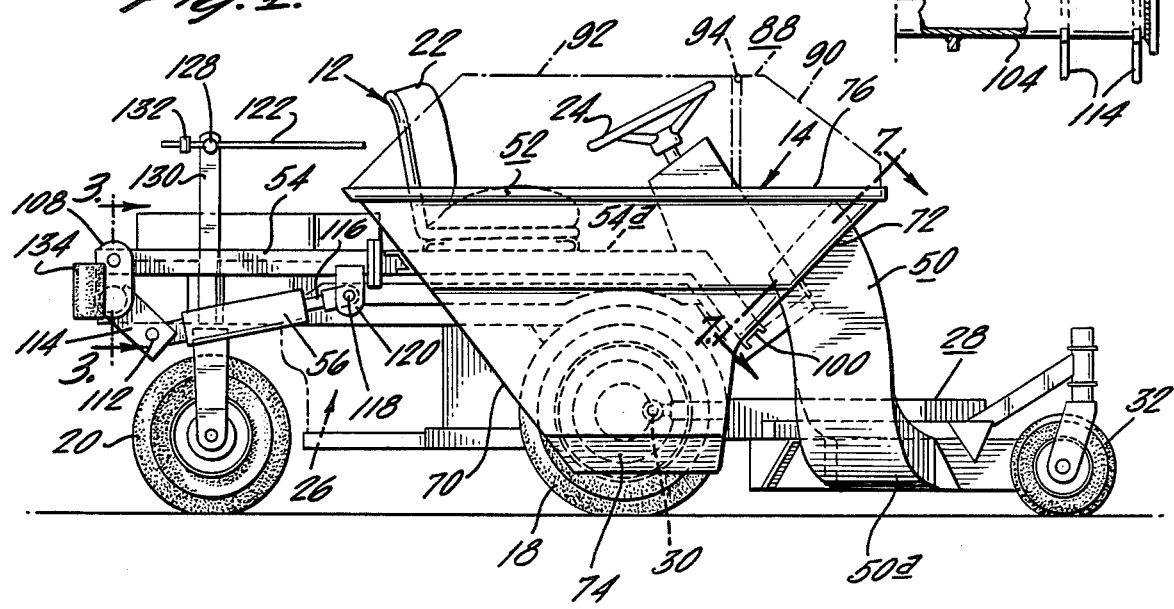

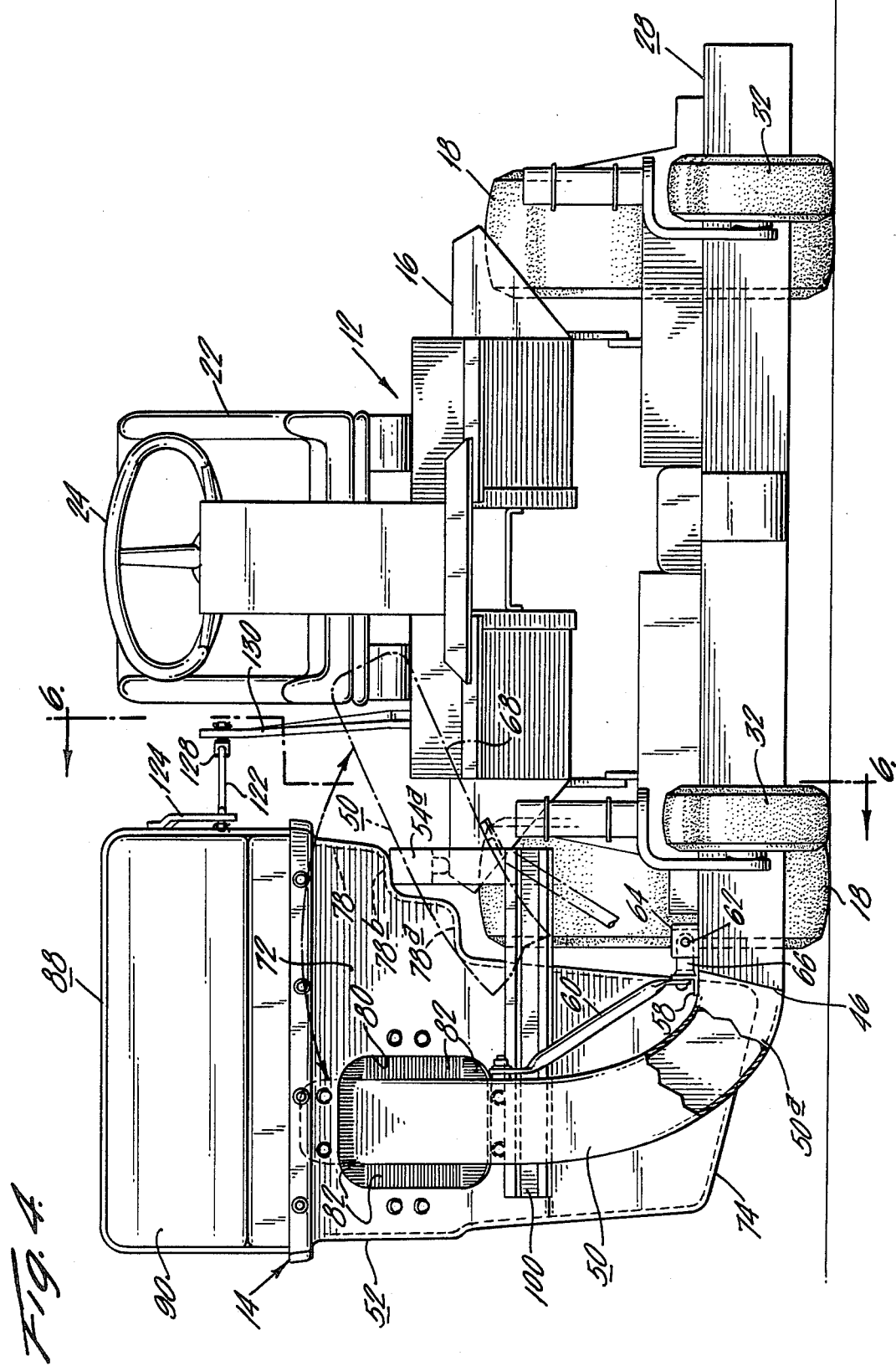

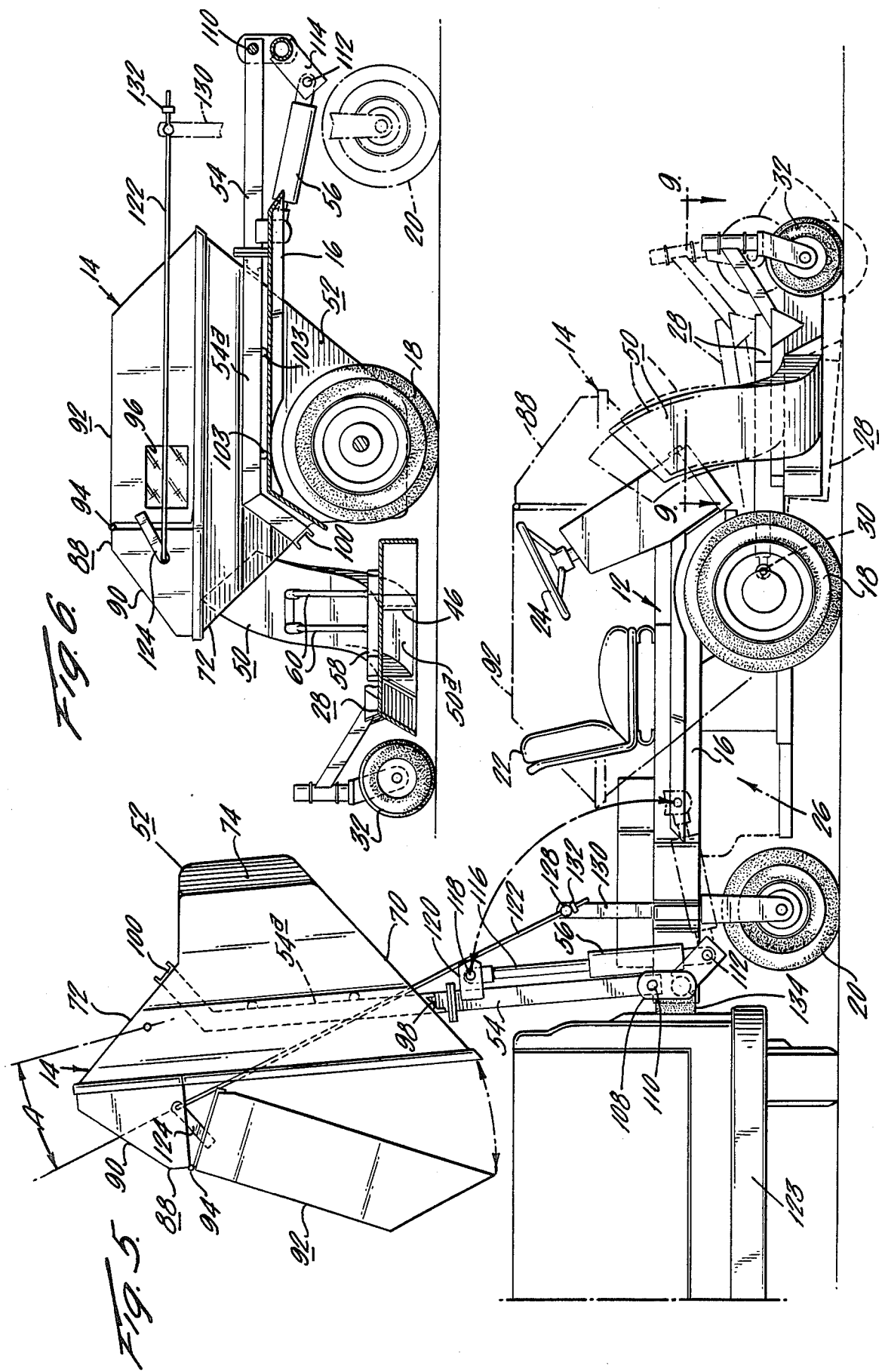

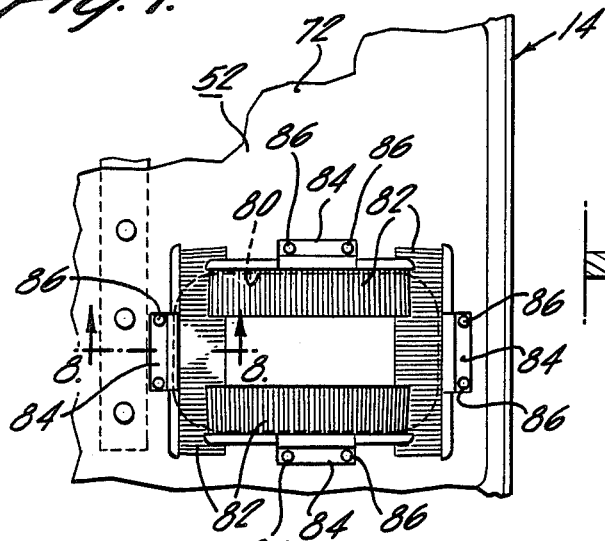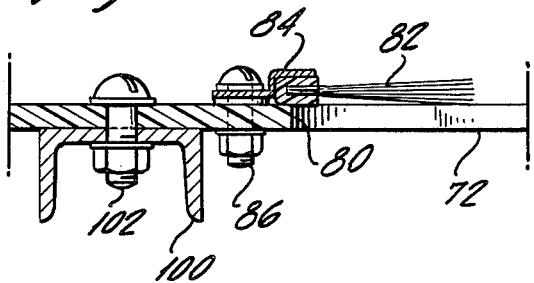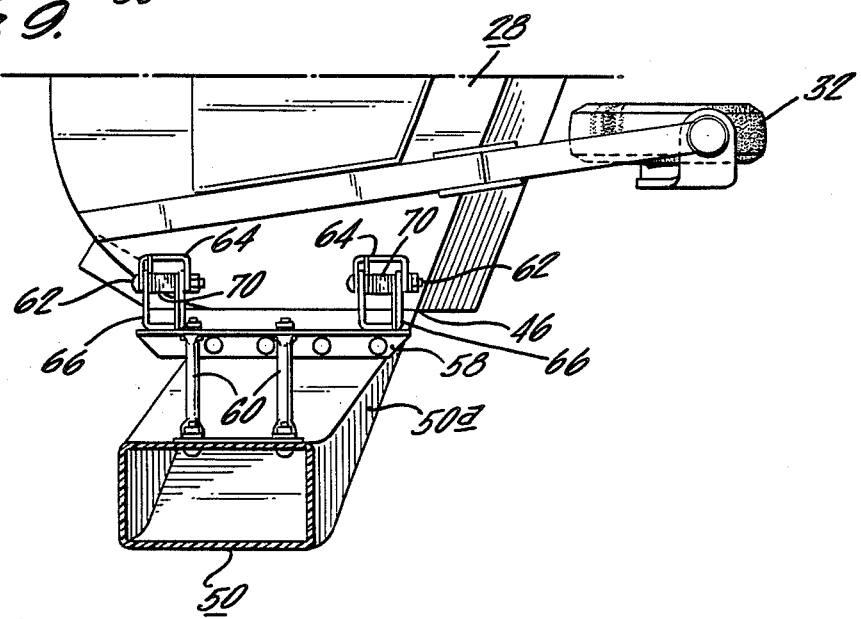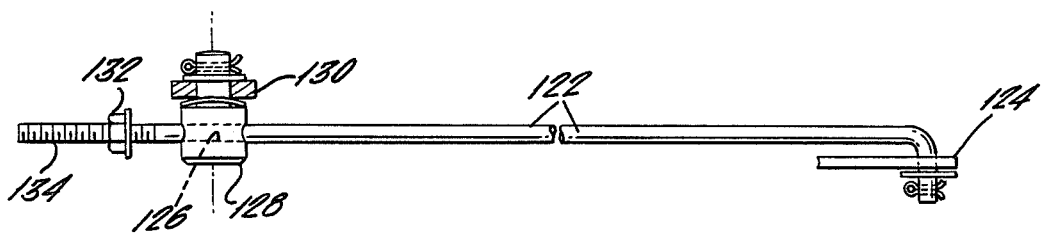

4,709,541

1

GRASS/LAWN DEBRIS HANDLING SYSTEM

This is a continuation of co-pending application Ser. No. 581,654 filed on Feb. 21, 1984, abandoned Jan. 22, 1986.

BACKGROUND OF THE INVENTION

The present invention relates generally to lawn maintenance equipment and relates more particularly to a system for side discharge type lawn mowers for collecting, transporting and dumping grass clippings and lawn debris picked up by the mower and discharged through the mower discharge duct.

A variety of collection devices have been proposed for lawn mowers to catch the grass clippings and other materials discharged by the mower blades during operation. For the most part, such collection devices have involved small bags or containers requiring frequent emptying and have been suited primarily for small mowers.

The mowing of large grass areas such as parks, athletic fields, golf course fairways and large estates, presents major problems in collecting, transporting and disposing of a large volume of materials, and the grass clippings have thus generally been allowed to remain on the grass surface. Although large sized systems have been developed for collecting clippings and other lawn debris, such systems are generally expensive since they usually employ a blower to produce the suction required to collect and convey the clippings and lawn debris to a remote collection chamber or trailer. Such systems are typically complicated, expensive to purchase and maintain, and furthermore require considerable operator time and effort to empty bags or containers.

SUMMARY OF THE INVENTION

The present invention overcomes the shortcomings of prior devices by providing a grass/lawn debris handling system which employs the discharge air flow of the mower deck to propel the grass and debris into a hopper disposed proximate the grass discharge duct. The front end of the hopper preferably overlies the discharge duct, and a short substantially vertical chute is employed to direct the grass and lawn debris into the hopper without need for a supplemental blower. The hopper is supported on the mower by a lift arm pivotally connected to the mower frame at a point rearwardly spaced from the hopper. A fluid actuated cylinder connected to the lift arm is operable to rotate the hopper rearwardly through an arc of at least 90°, thereby serving to elevate and dump the contents of the hopper. A door closing the top of the hopper is pivotally mounted so as to open automatically when the hopper is elevated into the dumping position.

The chute is attached to the mower deck which normally is articulated with respect to the mower frame to permit the deck to conform with undulations in the ground. An oversize opening in the hopper receives the upper end of the chute and flexible seal means in the opening accommodates relative movement between the chute upper end and the hopper. The chute is preferably pivotally attached to the mower deck to permit the pivotal movement thereof upon elevation of the hopper to allow access to the discharge duct.

The present invention is particularly adapted to mowers of the type characterized by a forwardly mounted mower deck and wherein the mower is steered by one or more rear wheels. Such mowers are highly maneuverable, usually having a zero turning radius, and thus minimize the amount of trimming required around trees, bushes and other obstacles. The present system is compact, mounts along one side of the mower, and does not significantly impede the maneuverability of the mower. In addition, the system can be quickly dumped without physical exertion by the operator, and without the operator leaving his normal mower controlling position.

It is accordingly a first object of the present invention to provide a grass/lawn debris handling system for a lawn mower which utilizes the discharge air flow of the mower deck to propel the grass/lawn debris into a hopper and which does not require a blower for this function.

A further object of the invention is to provide a handling system as described which can be quickly dumped without operator effort and without the operator leaving his normal station.

Another object of the invention is to provide a handling system as described which elevates the grass/debris collecting hopper to a substantial height before dumping, thus permitting the dumping of the contents into a truck or other elevated receptacle.

A still further object of the invention is to provide a handling system as described of a compact size which does not significantly impede the maneuverability of the mower.

Still another object of the invention is to provide a handling system as described which provides ready access to the mower discharge duct.

Another object of the invention is to provide a handling system as described which is particularly adapted to forwardly mounted mower decks which are articulated with respect to the mower frame.

Additional objects of the invention will be readily apparent from the following detailed description of a preferred embodiment thereof.

BRIEF DESCRIPTION OF THE DRAWINGS

FIG. 1 is a side elevational view of a mower equipped with a grass/lawn debris handling system in accordance with the present invention with the hopper door and deflecting hood shown in dot-dash lines;

FIG. 2 is a plan view of the mower and handling system shown in FIG. 1 but with the hopper door and deflecting hood removed;

FIG. 3 is an enlarged view partly in section taken along line 3—3 of FIG. 1;

FIG. 4 is an enlarged front elevational view of the mower and handling system shown in FIGS. 1 and 2;

FIG. 5 is a view similar to FIG. 1, but showing the handling system in the dumping position and additionally showing in broken and dot-dash lines the articulated mounting of the mower deck;

FIG. 6 is is a reduced sectional view taken along line 6—6 of FIG. 4;

FIG. 7 is a fragmentary view taken along line 7—7 of FIG. 1 showing the flexible seal means at the hopper opening with the chute removed;

FIG. 8 is an enlarged sectional view taken along line 8—8 of FIG. 7;

FIG. 9 is an enlarged view taken along line 9—9 of FIG. 5 showing the spring loaded pivotal mounting of the chute to the mower deck; and FIG. 10 is an enlarged view showing the details of the hopper door opening rod assembly.

DESCRIPTION OF THE PREFERRED EMBODIMENT

Referring to the drawings and particularly FIGS. 1, 2 and 4 thereof, a lawn mower generally designated 12 is shown equipped with a grass/lawn debris system generally designated 14 in accordance with the present invention. The mower 12 is of a conventional, commercially available type and will thus be described only in general terms.

The mower 12 includes a mower frame assembly 16 which, although comprised of a number of structural elements, will be referred to hereinafter simply as the mower frame. The mower frame is supported for movement on an opposed pair of traction wheels 18 disposed at the front end of the mower, and a single pivotally mounted wheel 20 at the rear end thereof. A seat 22 is provided on the frame 16 for the operator and a steering wheel 24 is mounted in front of the seat and operatively connected with the wheel 20 to provide directional control to the operator. An engine 26 mounted on the frame 16 supplies power to the traction wheels 18 by means of a conventional transmission, differential and axle arrangement (not shown). Engine controls, transmission controls and wheel braking controls are provided at the operator station in a conventional fashion, details of which have been omitted from the drawings.

A mower deck 28 is pivotally connected to the mower frame 16 at a pivot point 30 (FIG. 5). The mower deck may articulate about the pivot point 30 with respect to the mower frame as required during travel of the mower over undulating terrain. A pair of caster type wheel assemblies 32 on the front of the mower deck maintain the front of the deck at a uniform height above the ground. Since the pivot point 30 is near the axis of the wheels 18, the deck will follow the contour of the ground as defined by the casters 32 and the wheels 18. The employment of the single steerable rear wheel 20 and the castering wheels 32 permits extreme maneuverability of this type of mower, usually resulting in a zero turning radius.

As shown in FIG. 2, the mower deck 28 encloses a plurality of grass cutting blades 34, each mounted on a spindle 36 for rotation, the spindles being driven by a drive belt 38. The belt 38 is driven from a bevel gear box 40 connected by power take-off shaft 42 to the engine 26. A spring loaded idler 44 maintains the proper tension of the belt 38.

The mower deck is internally configured and the direction of rotation of the blades coordinated so as to direct a discharge flow of grass and lawn debris toward the right hand side thereof which is provided with an opening forming a discharge duct 46 through which the materials cut by the blades are expelled within a relatively high velocity air flow. Rotary lawn mowers characteristically produce a substantial air flow through the discharge duct for several purposes. A primary consideration is the clearing of the cut grass and lawn debris from the mower deck to prevent clogging of the region in which the blades are rotating and the adhering of materials to the sides of the housing. Of additional importance is the lifting of the grass into a vertical attitude to permit the blades to engage and cut the individual grass elements to a uniform height. Some types of lawn grasses and many types of weeds, such as crabgrass, are apt to assume a horizontal rather than a vertical disposition and the suction effect produced by the whirling mower blades is quite important in producing a satisfactory cutting action. Although good results can be obtained with a conventional mower deck utilized in conjunction with the present invention, for the most effective results, the invention is preferably used with a deck designed to produce a high degree of lift of the grass and a consequent high discharge rate of the cut grass and debris through the discharge duct.

The handling system 14 in accordance with the invention generally comprises a chute 50 mounted on the mower deck and communicating with a hopper 52 supported on the mower frame and pivotable into an elevated dumping position by means of a lift arm 54 pivotally mounted to the rear of the mower frame. The pivotal movement of the lift arm 54 is effected by a hydraulic cylinder 56 controlled by the operator from the seated operating position. With this general summary of the system components in mind, the details of the system will now be considered.

The chute 50 as seen most readily in FIGS. 1–4 and 5, comprises an upstanding substantially vertical hollow member which is preferably formed of a durable molded plastic having non-stick characteristics such as a cross-linked polyolefin. The chute, although predominently vertically oriented, at its lower end includes a smoothly curved transition portion 50a directed toward and communicating with the discharge duct 46 of the mower deck 28. As shown in FIGS. 4 and 9, the chute 50 is bolted to angle member 58 along the upper side of its lower end, which angle member also serves as a lower attachment point for chute support struts 60 bolted at their upper ends to the upper side of the chute. The chute is pivoted about a pair of spaced pivot screws 62 passing through spaced U-shaped bracket 64 on the mower deck. U-shaped brackets 66 secured to the angle member 58 are pivotally disposed within the bracket 64 on the pivot screws 62 and permit the inward tilting movement of the chute to the position 68 shown in broken lines in FIG. 4. Torsion springs 69 disposed around the pivot screws 62 and acting against the brackets 64 and 66 spring load the chute toward its normal substantially vertical operating position.

As shown in FIG. 1, the chute 50 flairs slightly rearwardly at its upper end to initiate a rearward movement to the materials passing therethrough. The height of the chute 50 is more than sufficient to pass through the hopper front wall for reasons described below.

The hopper 52 comprises a rigid structure which is preferably formed of molded plastic of a durable, non-stick type such as a cross-linked polyolefin. The hopper in the preferred embodiment is characterized by an outwardly inclined rear wall 70, and a front wall 72, the upper portion of which is also outwardly inclined. The inclined front and rear walls produce a hopper having a relatively small bottom 74 and a relatively large top opening 76. As shown in FIG. 2, the inner sidewall 78 of the hopper includes steps 78a and 78b which allow the hopper to nest compactly over the adjacent elements of the mower, including the adjacent wheel 18 and the mower frame 16.

As shown most clearly in FIG. 4, the inclined portion of the front wall 72 of the hopper is provided with an opening 80 to receive the upper end of the chute 50. The opening 80 is oversized to permit relative movement of the chute and hopper as may be expected to occur in view of the articulated connection of the mower deck to the mower frame, and the mounting of the chute on the mower deck. To provide a sealing of the gap between the upper end of the chute and the hopper opening 80, a plurality of brushes 82 are mounted within the hopper extending into the opening as shown most clearly in FIG. 7. The brushes are secured to the hopper by mounting brackets 84 which are bolted to the hopper by bolts 86. The bristles of the brushes, as shown in Fig. 7, in the absence of the chute upper end, define an aperture somewhat smaller than the size of the chute. With the chute extending through the opening as shown in FIGS. 2 and 4, the bristles of the brushes 82 are displaced to some extent to permit entrance of the chute and form a flexible seal which effectively prevents leakage of grass clippings, dust or debris from the hopper.

A deflecting hood 88 having a rearwardly inclined surface 90 is mounted over the top of the hopper at the forward end thereof opposite the upper end of the chute 50. The deflecting hood 88, which may be made of a molded plastic, serves to deflect upwardly directed grass and lawn debris rearwardly and downwardly into the hopper.

A hopper door 92 pivotally connected to the rear upper edge of the deflecting hood 88 by hinge 94, closes the top of the hopper. The door 92 is preferably formed of a metal frame covered with air-permeable material such as a loosely woven cloth which will allow the air passing through the chute 50 into the hopper to escape while trapping the grass clippings, lawn debris and dust within the hopper. As shown in FIG. 6, a window 96 preferably made of a plastic material is provided in the side of the door 92 to permit the operator to observe the fill level of the hopper.

The hopper 52 is mounted on the forward end 54a of the lift arm 54 as can be seen most readily in the elevated hopper position shown in FIG. 5. The forward portion of the lift arm includes transverse support members 98 and 100 extending respectively at the rear and front of the hopper and bolted to the hopper rear and front walls by bolts 102 as shown in FIG. 8. As may be seen in FIG. 4, the step 78b of the hopper sidewall 78 rests on the forward portion 54a of the lift arm. Resilient bumpers 103 are provided on the underside of the lift arm front portion 54a as shown in FIG. 6 and seat against the mower frame to support the lift arm and hopper in the normal grass collecting position of the hopper.

The lift arm 54 is pivotally mounted to the mower frame 16 at the rear thereof as shown in FIGS. 1–3, and particularly FIG. 3. A transverse tubular member 104 mounted on the rear of the mower frame by brackets 106 extends outwardly and supports a pair of spaced pivot plates 108. A pivot pin 110 passing rotatably through apertures in the plates 108 is attached to the rear end of the lift arm 54.

The hydraulic cylinder 56 is pivotally connected at 112 to a pair of spaced plates 114 attached to the transverse tube 104. The outer end of piston rod 116 of the cylinder 56 is pivotally connected at 118 to a spaced pair of plates 120 attached to the lift arm 54. The cylinder 56 is connected with a hydraulic fluid pump driven by the engine 26 and is controlled by the operator from the driving station by means of conventional control valves.

Although the hopper door 92 should swing open by gravity force when the lift arm and hopper are pivoted to the dumping position shown in FIG. 5, in the preferred embodiment a door opening rod 122 is provided which is pivotally connected at its forward end to an arm 124 attached to the door frame. As shown in detail in FIG. 10, the rod 122 passes slidably through a transverse bore 126 in pin 128 which is pivotally mounted on an upstanding bracket 130. A stop nut 132 on the threaded end 134 of the rod 122 engages the pin 128 as the hopper approaches its dumping position as shown in FIG. 5. This creates a downward force on the arm 124, causing the door 92 to open in a predictable manner. The door opening action of the rod 122 occurs only during hopper movement through angle A of FIG. 5, and premature opening and spillage of the hopper contents is thus avoided. Upon return of the hopper to its normal collecting position, the weight of the door provides an automatic door closing action and slides the rod 122 back through the bore 126 in pin 128.

In operation, the mower operator carries out his mowing duties in the usual manner, checking occasionally on the level of the hopper contents through the window 96. The grass and lawn debris discharged by the blades from the mower deck pass through the chute into the hopper, the air passing on through the door cover. When the hopper is full, the mower is backed up to the grass/lawn debris receptacle, which might for example be a truck as partially shown for example at 123 in FIG. 5. The cylinder 56 is then actuated, elevating the lift arm 54 and hopper 52 into the dumping position shown in FIG. 5. The rod 122 opens the hopper door 92 just prior to the hopper reaching its elevated dumping position. In the preferred embodiment, the lift arm swings through an arc of slightly more than 90° so that the hopper contents can be discharged cleanly into an elevated receptacle, such as a truck. Bumpers 134 of a resilient material are attached to tube 104 at the rear of the mower to permit the drive to closely approach and engage the receptacle into which the hopper is to be dumped without damaging either the mower or the receptacle.

Because of the inclined rear wall 70 of the hopper 52, the contents of the hopper are quickly discharged from the elevated hopper and the trajectory of the discharge is rearwardly away from the mower. The use of a nonstick plastic to form the hopper further facilitates the clean and rapid discharge of the hopper contents.

Upon completion of the dumping operation, the operator reverses the direction of movement of the cylinder 56, returning the hopper to its normal collecting position to permit resumption of the mowing operation. The hopper reconnects readily with the upstanding chute 50 by virtue of the oversized opening 80 therein and the flexible seal provided by the brushes 82. The door 92, as indicated above, closes under its own weight as the hopper is returned to its normal position.

As shown in FIG. 5, the mower deck may articulate with respect to the mower frame, thus changing the degree to which the upper end of the chute extends into the hopper. The rearwardly curving shape of the upper end of the chute minimizes the dislocation of the chute with respect to the hopper opening during such movement. The chute should be sufficiently high to accommodate such articulating movement of the mower and also any permissible height adjustments of the mower without disconnection of the chute from the hopper.

Should access to the mower deck discharge duct be desired at any time, such as to clear clogged grass or debris which might accumulate in the duct, the chute 50, following a slight raising of the hopper, can be pivoted inwardly as shown at 68 in FIG. 4. Upon release of the chute, the springs 69 will automatically return the chute to its normal operating position and the hopper can then be lowered to reconnect the chute with the interior thereof.

The proximity of the hopper to the mower deck allows the use of a very short chute to connect the deck discharge duct with the hopper. This arrangement eliminates the need for the usual blower for transporting materials to a remotely located bag or container. Furthermore, this arrangement does not add to the length of the mower and hence does not affect its maneuverability as would a rear mounted hopper. Although the width of the mower is slightly increased with the addition of the present handling system, it has been found that a large sixteen bushel hopper increases the overall width of the mower by only seven inches which is not functionally significant.

The additional weight of the system at one side of the mower can be readily compensated for by adding a wheel weight to the opposite traction wheel 18. The weight of the hopper and its contents is substantially centered over the axis of the traction wheels and hence makes such compensation a relatively simple matter.

Although the means for effecting rotation of the hopper in the illustrated preferred embodiment comprises a fluid actuated cylinder, other actuating means could be employed, such as an electric linear actuator.

Manifestly, changes in details of construction can be effected by those skilled in the art without departing from the invention.

We claim:

1. A grass/lawn debris handling system for a lawn mower having a side grass discharge duct, said system comprising:
    a hopper adapted for mounting on the side of a mower proximate the mower grass discharge duct and having a hopper opening near the upper end of said hopper, at least a portion of said hopper overlying said grass discharge duct,
    a chute communicating at its lower end with the mower grass discharge duct and at its upper end with said hopper opening when said hopper is in a filling position, said hopper having an uppermost portion when in said filling position,
    means pivotally mounting said hopper on said mower for movement between said filling position and an elevated dumping position, the lowermost portion of said hopper when in said elevated dumping position being spaced substantially above the position of said uppermost portion of said hopper when in the filling position,
    and means selectively operable to effect rotation of said hopper into said elevated dumping position.

2. The invention as claimed in claim 1 wherein said means pivotally mounting said hopper on said mower comprises a lift arm pivotally mounted on said mower.

3. The invention as claimed in claim 2 wherein said lift arm pivot point on the mower is spaced substantially rearwardly of said hopper to effect a rearward movement of the hopper and its contents into the dumping position.

4. The invention as claimed in claim 1 wherein said means operable to effect rotation of said hopper into said dumping position comprises a fluid actuated cylinder.

5. The invention as claimed in claim 1 wherein said means operable to effect rotation of said hopper is operable to effect at least a 90° rotation of said hopper.

6. The invention as claimed in claim 1 wherein said hopper front and rear walls are inclined so that the cross-sectional area of the top of the hopper is substantially larger than that of the bottom thereof.

7. The invention as claimed in claim 1 wherein said hopper includes a door closing the top of the hopper, and means pivotally mounting said door to provide the opening thereof upon movement of said hopper into the dumping position.

8. The invention as claimed in claim 7 wherein said hopper door is formed at least in part of an air-permeable material.

9. A grass/lawn debris handling system for a lawn mower having a mower deck mounted in a manner permitting relative vertical movement between the deck and the mower frame, said mower deck having a side grass discharge duct, comprising;
    a rigid hopper adapted for mounting on the mower at one side thereof proximate the grass discharge duct with a portion of said hopper overlying said discharge duct, an opening near the upper end of said hopper,
    a substantially vertical chute mounted on the mower discharge duct communicating at its lower end with the discharge duct and at its upper end with said hopper opening when said hopper is in a filling position, said hopper having an uppermost portion when in said filling position,
    means permitting relative movement including the selective disconnection and reconnection of said chute and hopper, said means comprising the oversizing of said opening in said hopper for receiving said chute upper end, and flexible seal means in said opening for sealing the space between the hopper and chute end,
    means pivotally mounting said hopper on said mower for movement between said filling position and an elevated dumping position, said latter means comprising a lift arm pivotally mounted on said mower, the lowermost portion of said hopper when in said elevated dumping position being spaced substantially above the position of said uppermost portion of said hopper when in the filling postion,
    and means selectively operable to effect rotation of said hopper into said elevated dumping position.

10. The invention as claimed in claim 9 wherein said lift arm pivot point on the mower is spaced substantially rearwardly of said hopper to effect a rearward movement of the hopper and its contents into the dumping position.

11. The invention as claimed in claim 9 wherein said means operable to effect rotation of said hopper into a dumping position comprises a fluid actuated cylinder.

12. The invention as claimed in claim 9 wherein said means operable to effect rotation of said hopper effects at least a 90° rotation of said hopper.

13. The invention as claimed in claim 9 wherein said hopper front and rear walls are inclined so that the cross-sectional area of the top of the hopper is substantially larger than that of the bottom thereof.

14. The invention as claimed in claim 9 wherein said hopper includes a door closing the top of the hopper and means pivotally mounting said door to provide the opening thereof upon movement of said hopper into the dumping position.

15. A lawn mower having a grass/lawn debris handling system, said mower comprising a mower frame, a pair of traction wheels at the forward end of said frame, an engine on said frame for selectively driving said traction wheels, at least one wheel pivotally mounted at the rear of said frame for directional control of said mower,
- a mower deck attached to said frame forwardly of said traction wheels and mounted for articulated vertical movement with respect to said frame, said mower deck including at least one mower blade and means operatively connecting said blade with said engine for rotation thereof, said mower deck having a side grass discharge duct,
- a hopper mounted on the mower frame at one side thereof proximate said mower deck grass discharge duct, a front portion of said hopper substantially overlying grass deck discharge duct, said hopper having a hopper opening near the upper end of said hopper in said hopper front portion,
- a substantially vertical chute mounted on the mower discharge duct communicating at its lower end with the discharge duct and at its upper end with said hopper opening when said hopper is in a filling position, said hopper having an uppermost portion when in said filling position,
- means permitting relative movement including the selective disconnection and reconnection of said chute and hopper, said latter means comprising the oversizing of said opening in said hopper for receiving said chute upper end, and flexible seal means in said opening for sealing the space between the hopper and chute end,
- means pivotally mounting said hopper on said mower for movement between said filling position and an elevated dumping position, said latter means comprising a lift arm pivotally mounted on said mower frame at a pivot point spaced from said hopper, the lowermost portion of said hopper when in said elevated dumping position being spaced substantially above the position of said uppermost portion of said hopper when in the filling position,
- and means selectively operable to effect rotation of said lift arm to rotate said hopper into an elevated dumping position.

16. The invention as claimed in claim 15 wherein said lift arm is pivotally mounted on the rear of said mower frame to effect a dumping of the hopper to the rear of the mower.

17. The invention as claimed in claim 15 wherein said means operable to effect rotation of said hopper comprises a fluid actuated cylinder.

18. The invention as claimed in claim 15 wherein said means operable to effect rotation of said hopper effects at least a 90° rotation of said hopper.

19. The invention as claimed in claim 15 wherein said hopper front and rear walls are inclined so that the cross-sectional area of the top of the hopper is substantially larger than that of the bottom thereof.

20. The invention as claimed in claim 15 wherein said hopper includes a door closing the top of the hopper, and means pivotally mounting said door to provide the opening thereof upon movement of said hopper into the dumping position.

21. The invention as claimed in claim 20 wherein said hopper door is formed at least in part of an air-permeable material.

22. A grass/lawn debris handling system for a lawn mower having a side grass discharge duct, said system comprising:
- a hopper adapted for mounting on the side of a mower proximate the grass discharge duct, a portion of said hopper substantially overlying said grass discharge duct, said hopper having a hopper opening near the upper end of said hopper in said duct overlying portion.
- a substantially vertical chute mounted on the mower discharge duct communicating at its lower end with the discharge duct and at its upper end with said hopper opening when said hopper is in a filling position,
- means pivotally mounting said hopper on said mower for movement between said filling position and an elevated dumping position,
- and means selectively operable to effect rotation of said hopper into said elevated dumping position.

* * * * *